May 8, 1934.　　　K. S. SIDEL　　　1,957,676
BALING WIRE
Filed Oct. 13, 1933
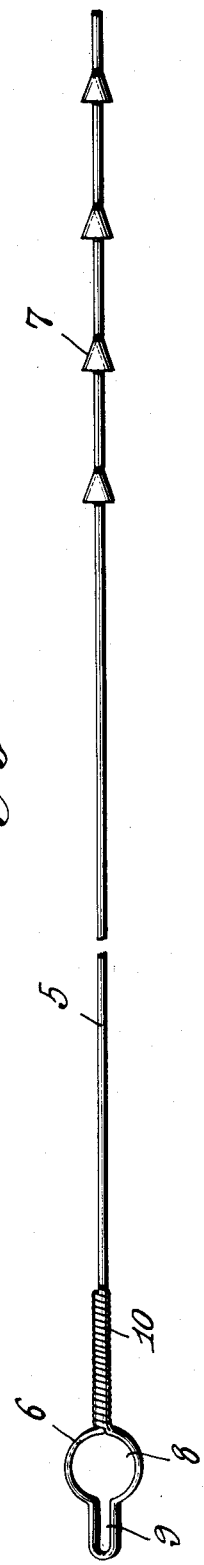
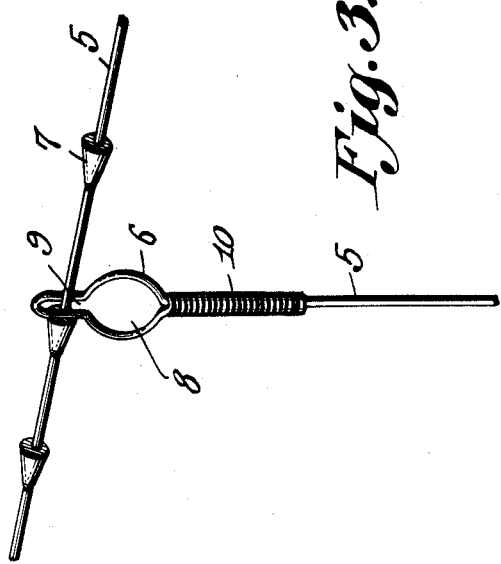
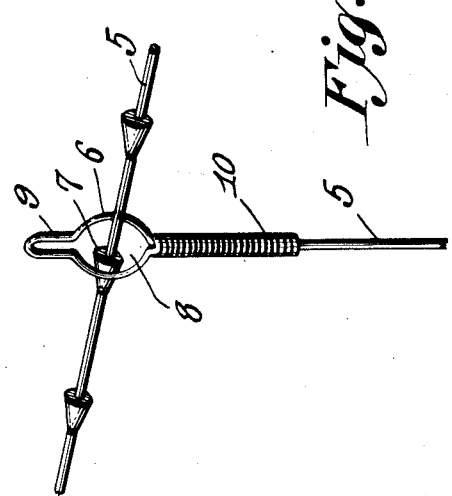
Inventor
Kennith S. Sidel Patented May 8, 1934

1,957,676

UNITED STATES PATENT OFFICE 1,957,676

BALING WIRE

Kennith S. Sidel, Lebanon, Ill.

Application October 13, 1933, Serial No. 693,409

2 Claims. (Cl. 24—27)

My invention relates to baling wire especially adapted for tieing bales of straw and hay.

The primary object of the invention is to provide baling wire having fastening means for quickly securing the ends of the wire together, the fastening means being adjustable to make allowance for bales of different lengths.

A further object of the invention is to provide a baling wire which is simple and durable in construction, reliable and efficient in use and inexpensive to manufacture.

Other objects and advantages of the invention will be apparent during the course of the following description.

In the accompanying drawing, forming a part of this specification and in which like numerals are employed to designate like parts throughout the same, Fig. 1 is a view of a length of baling wire, showing the improved fastening means, Fig. 2 is a view of the ends of the baling wire, in position for interlocking engagement, and, Fig. 3 is a view of the ends in interlocking engagement.

In the drawing, wherein for the purpose of illustration, I have shown a preferred embodiment of my invention, the numeral 5, denotes a strand of baling wire having a loop 6 formed at one end, adapted to receive the cone-shape catches 7, formed integral with the opposite end of the wire, at spaced intervals, which are designed for interlocking engagement with the loop. The loop is provided with a circular opening 8, through which the catches 7 are free to move, and extending from the opening 8, in longitudinal alinement with the strand of wire is a restricted opening 9, designed for interlocking engagement with the catches. The loop is formed by reversely bending the end of the wire and twisting the free end around the wire, as at 10. The catches 7 are cone-shape protuberances, surrounding the wire and are formed integral therewith.

In use, the end of the baling wire 5 having the catches 7 formed thereon is inserted through the opening 8 of the loop 6, as shown in Fig. 2, and after drawing the wire tightly around the bale being tied, the end of the wire passing through the loop is moved into the restricted opening 9 of the loop, bringing one of the catches 7 into interlocking engagement with the loop, as shown in Fig. 3, thus securely fastening the ends of the wire together.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. A baling wire comprising a strand of wire, a loop formed at one end of said wire, and a series of spaced protuberances formed near the opposite end of said wire, said protuberances being concentric to the axis of the wire and tapered at one end, the opposite end being disposed at an angle to the axis of the wire for interlocking engagement with said loop when the protuberances are passed therethrough.

2. A baling wire comprising a strand of wire, a loop formed at one end of said wire having a restricted portion, and a series of spaced protuberances formed near the opposite end of said wire, said protuberances being concentric to the axis of the wire, one end of the protuberances being tapered and merging with said wire, the opposite ends of the protuberances being disposed at an angle to the axis of the wire for interlocking engagement with the restricted portion of said loop when the wire is disposed therein.

KENNITH S. SIDEL.